United States Patent [19]

Morello

[11] 4,016,140

[45] Apr. 5, 1977

[54] AMIDE-IMIDE COPOLYMER MOLDINGS AND METHOD OF PREPARATION

[75] Inventor: Edwin F. Morello, Hammond, Ind.

[73] Assignee: Standard Oil Company, Chicago, Ill.

[22] Filed: Dec. 30, 1974

[21] Appl. No.: 537,255

Related U.S. Application Data

[63] Continuation of Ser. No. 239,823, March 30, 1972, abandoned, which is a continuation of Ser. No. 79,677, Oct. 9, 1970, abandoned.

[52] U.S. Cl. .............................. 260/47 CP; 260/49; 260/63 R; 260/78 TF; 260/857 R; 264/331
[51] Int. Cl.$^2$ .................... C08G 73/14; B29F 5/00
[58] Field of Search ............ 260/47 CP, 49, 78 TF; 264/331, 857 R, 63 R

[56] References Cited

UNITED STATES PATENTS

| | | | |
|---|---|---|---|
| 3,260,691 | 7/1966 | Lavin et al. ...................... | 260/30.2 |
| 3,347,828 | 10/1967 | Stephens et al. .................... | 260/47 |
| 3,392,144 | 7/1968 | Holub .............................. | 260/46.5 |
| 3,494,890 | 2/1970 | Morello ............................... | 260/47 |
| 3,546,152 | 12/1970 | Bolton ............................. | 260/29.2 |
| 3,573,260 | 3/1971 | Morello ............................. | 260/78 |

*Primary Examiner*—Lester L. Lee
*Attorney, Agent, or Firm*—Stanley M. Welsh; Arthur G. Gilkes; William T. McClain

[57] ABSTRACT

Copolymers of the amide-imide variety are made from a mixture of two or more largely- or wholly-aromatic primary diamines and an aromatic polycarboxylic-acid-anhydride derivative. A process for fabricating molded articles from these copolymers is described which comprises heat treating the copolymers from about 300° to about 700° F. and then applying a pressure of about 200 p.s.i. to about 30,000 p.s.i. to said partially cured material which has been preheated to a temperature within the range of about 200° to about 750° F. and subsequentlyejecting the coalesced polyamide-imide in the form of a shaped article.

18 Claims, No Drawings

AMIDE-IMIDE COPOLYMER MOLDINGS AND METHOD OF PREPARATION

This is a continuation, of application Ser. No. 239,823, filed Mar. 30, 1972 which is a continuation of application Ser. No. 79,677 filed Oct. 9, 1970, both of which are now abandoned.

BACKGROUND OF THE INVENTION

Amide-imide polymers are a relatively new class of substances known for their solubility in nitrogen-containing solvents when in the largely-polyamide form. They can be heat treated to the imidized form producing insoluble, inflexible, tough, heat-resistant dielectric materials useful as electric insulating coatings and impregnating material. Their use in molding applications has been limited in the past because the more temperature-resistant polymers soften at too high a temperature to be practically molded and also because a preliminary lengthy heat and solvent treatment is required, prior to molding, to circumvent friability and poor mold-release properties in the fabricated article. Now it has been found that amide-imide copolymers which are prepared from mixtures of largely- or wholly-aromatic primary diamines form molding powders which combine the properties of a simplified heat treatment prior to molding and excellent thermal stability and mold release characteristics in the molded article in addition to remarkably improved hot-flow characteristics of the softened material during the molding process.

SUMMARY OF THE INVENTION

This invention relates to a novel class of amide-imide copolymers having superior molding properties which are obtained by reacting a polycarboxylic-acid-anhydride derivative with a mixture of primary diamines to form a material suitable for molding and to a process for fabricating shaped articles therefrom. More specifically, it has been found that mixtures of wholly- or largely-aromatic primary diamines when copolymerized with an aromatic tricarboxylic-acid-anhydride derivative form copolymers of substantially improved properties which may be molded by a process comprising heat-treating the copolymer for a short time and then applying heat and pressure to form a shaped article.

STATEMENT OF THE INVENTION

The copolymers for the preparation of the molding powders of this invention are prepared by reacting an acyl halide derivative of an aromatic tricarboxylic-acid-anhydride with a mixture of largely-aromatic or wholly-aromatic primary diamines. The resulting products are polyamides wherein the linking groups are predominantly amide groups, although some may be imide groups, and wherein the structure contains free carboxylic acid groups which are capable of further reaction. Such polyamides are low to moderate molecular weight (7–12,000 as prepared) polymeric substances having in their molecule units of:

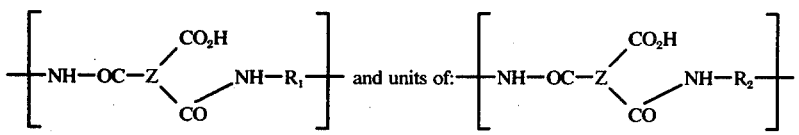

wherein the free carboxyl groups are ortho to one amide group, Z is a trivalent aromatic moiety containing 1 to 4 benzene rings or lower-alkyl-substituted benzene rings, $R_1$ and $R_2$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals of from 6 to about 10 carbon atoms joined directly or by stable linkages such as —O—, methylene, —CO—, —$SO_2$—, —S—; for example, —R′—O—R′—, —R′—$CH_2$—R′—, —R′—CO—R′—, —R′—$SO_2$—R′— and —R′—S—R′—, wherein R′ is the said divalent aromatic hydrocarbon radical. By lower alkyl is meant an aliphatic radical of from 1 to about 6 carbon atoms.

Said polyamides are capable of substantially complete imidization by heating by which they form the polyamide-imide structure having to a substantial extent reoccurring units of:

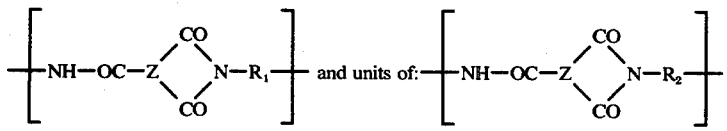

wherein one carbonyl is meta to and one carbonyl is para to each amide group and wherein Z, $R_1$ and $R_2$ are defined as above. Typical copolymers of this invention are up to about 50 percent imidized prior to heat treatment, typically 10 percent to 40 percent.

The polyamide-imide copolymers of this invention are prepared from an anhydride-containing substance and a mixture of primary diamine-containing substances. Usefully the anhydride-containing material is an acyl halide derivative of the anhydride of an aromatic tricarboxylic acid which contains 1 to 4 benzene or lower-alkyl-substituted benzene rings and wherein two of the carboxyl groups are ortho to one another. Preferably, the acyl halide derivative of the anhydride has a single benzene or lower-alkyl-substituted benzene ring and, most preferably, the substance is the acyl chloride derivative of trimellitic acid anhydride.

Usefully the mixture of primary diamines contain two or more wholly- or largely-aromatic primary diamines. More particularly, they are wholly- or largely-aromatic primary diamines containing from 6 to about 10 carbon atoms or primary aromatic diamines composed of two divalent aromatic moieties of from 6 to about 10 carbon atoms, each moiety containing one primary amine group, and the moieties linked directly or through, for example, a bridging —O—, —S—, —SO$_2$—, —CO— or methylene group. Preferably, the mixture of aromatic primary diamines is two-component and is composed of meta-phenylenediamine and p,p'-oxybis(aniline), p,p'-methylenebis(aniline), and p,p'-oxybis(aniline), p,p'-sulfonylbis(aniline) and p,p'oxybis(aniline), p,p'λ sulfonylbis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). The aromatic nature of the diamines provides the excellent thermal properties of the copolymers while the primary amine groups permit the desired imide rings and amide linkages to be formed.

Usually copolymerization is carried out in the presence of a solvent such as N-methylpyrrolidone, N,N-dimethylformamide, N,N-dimethyl acetamide or mixtures of cresols such as commercially available Cresylic 9PX (Pitt-Consol Chemical Co.), preferably N,N-dimethylacetamide. The reaction should be carried under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° to 50° C. preferred for the nitrogen-containing solvents.

To maintain anhydrous conditions during reaction a slow flow of an inert gas such as nitrogen, argon or carbon dioxide is used. The flow rate of the gas should be adjusted such that little solvent is removed from the reaction zone.

The primary diamine-containing substances and the anhydride-containing substance are preferably present in essentially equimolar ratio. However, variations of up to about 2.5 mole percent in either direction do not substantially affect the resulting polymer. Beyond this percentage, in either direction tensile strengths and elongation values decrease substantially.

After reaction the polymer is precipitated by the admixing of distilled water and washed with addition distilled water until the wash water has a pH of about 4 to about 5. Undistilled water may be used but the copolymers sorb the cations present in undistilled water which can, if their concentration is sufficiently high, deteriorate the properties of the copolymers.

The initial reaction between the acyl halide derivative of the anhydride and the primary diamine mixture results in a polyamide having an amide content of greater than about 50 percent of the linking units in the polymer. The amide content varies from about 50 percent to about 90 percent and the imide content is about 10 percent to about 50 percent. Such polymeric products are readily soluble in organic solvents such as N-methylpyrrolidone and dimethylacetamide.

The properties of the copolymers of this invention depend upon the mole ratio of the primary diamines used and also upon their chemical natures. When two diamines are used, to achieve a polymer usefully combining the properties of both diamines, it is usual to stay within the range of about 10 mole percent of the first diamine and 90 mole percent of the second diamine to about 90 mole percent of the first diamine and 10 mole percent of the second diamine. Preferably, the range is about a 20 to 80 mole ratio to about an 80 to 20 mole ratio. In the preferred embodiment wherein the acyl chloride of trimellitic acid is copolymerized with a mixture of p,p'-oxybis(aniline) and meta-phenylenediamine the preferred range is from about 30 mole percent of the former and about 70 mole percent of the latter to about 70 mole percent of the former and about 30 mole percent of the latter.

The reaction described above is a process for preparing a low to moderate molecular weight solid copolymer having film-forming properties and having solubility in an organic solvent, which process comprises reacting essentially equimolar amounts of an aromatic primary diamine mixture and an acyl halide derivative of an aromatic tricarboxylic-acid-anhydride derivative which contains one acyl halide group in an organic solvent, under substantially anhydrous conditions and for a period of time and at a temperature controlled to produce a copolymer with free carboxyl groups and amide groups available for further reaction, the polymer being soluble in said organic solvent. Further details of the preparation of the polyamide-imide polymers can be found in Canadian Pat. No. 756,179.

Molding powders made from the copolymers outlined above have superior properties compared to those from a single diamine. For example, polymers made from p,p'-oxybis(aniline) have excellent thermal stability but have molding temperatures high enough to be outside the practical range. Polymers made from m-phenylenediamine have reasonable molding temperatures but require complicated and lengthy heat and solvent treatment prior to molding. The copolymers below are free from both of these difficulties and as molded have additional physical properties which are substantially superior to amide-imide polymers made from a single diamine. In general these copolymers find their greatest current utility as molding powders suitable for the uses of known molding powders.

To convert the copolymers of this invention to molding grade compositions, the critical step of a final heat treatment prior to molding is required. The polymer is heated to a temperature of about 300° to about 700° F. for about 0.5 to about 5 hours, preferably from about 500° F. to about 600° F. for about 1 to about 2 hours for the copolymer from the acyl chloride of trimellitic acid anhydride, p,p'-oxybis(aniline) and meta-phenylenediamine. This treatment provides the molecular weight increase necessary for good copolymer properties and also more completely imidizes the polymers. Typically, at this point molecular weights are substantially above 30,000 to 40,000. Additionally, this heating is necessary to prevent water evolution later in the molding step which would cause formation of voids in the molded item. Typically, anmide-imide type polymers when converted to molding powders have required extensive treatment with water and a nitrogen-containing organic solvent for up to 8 hours (c.f., Ser. No. 755,432). Thus, the heat treatment required for preparing molding grade amide-imide copolymers is substantially less than that required for preparing molding grade amide-imide polymers.

Molding conditions for the copolymers vary with the type of mold used and with the size and configuration of the molded pieces. A typical molding schedule for compression molding of small items is given in Table I below.

TABLE I

COMPRESSION MOLDING SCHEDULE - COPOLYMER FROM 4-TMAC, MPDA AND OBA*

1. Preheat mold** in press to 600 to 625° F.
2. Charge cold molding copolymer*** to the mold and press according to the following molding schedule. A 78 gram charge gives a 5½ inch diameter × ⅝ inch disc:

| | Pressure, tons | Time Minutes | Pressure p.s.i. |
|---|---|---|---|
| 1. | 2½ | 10 | 210 |
| 2. | 10 | 4 | 840 |
| 3. | 25 | 3 | 2100 |
| 4. | 50 | 3 | 4200 |
| 5. | 25 | 5 | 2100 |

3. The mold and contents are cooled to 500° F. under pressure (25 tons) and the molded specimen ejected immediately.

*See Table II for the meaning of the abbreviations.
**Mold hardware is 5½ inch diameter I.D. × 8½ inch O.D. and 1¾ inch thick.
***Heat treated prior to molding at 550° F. for 1 hour.

The copolymers can be charged cold to the mold and conditioned to temperature equilibrium in the mold or oven-heated prior to molding at about 500° F. Usefully, molding temperatures of from about 200° to about 750° F. at pressures of about 200 p.s.i. to about 30,000 p.s.i. are used. More preferably, molding temperatures of from about 400° to about 750° F. at pressures of about 200 p.s.i. to about 25,000 p.s.i. are used and, most preferably the molding temperature range is from about 600° to about 700° F. at pressures of about 1,000 p.s.i. to about 20,000 p.s.i.

In the preferred embodiment wherein the copolymer is made from trimellitoyl chloride anhydride, meta-phenylenediamine and p,p'-oxybis(aniline) the preheat treatment is carried out at about 500° to about 600° F. and usefully molded in the temperature range from about 200° to about 700° F. at pressures of about 200 p.s.i. to about 30,000 p.s.i. More preferably, molding is accomplished in the temperature range from about 400° to about 700° F. at about 200 p.s.i. to about 25,000 p.s.i. and, most preferably, the temperature range is from about 600° to about 700° F. at pressures of about 1,000 p.s.i. to about 20,000 p.s.i.

Injection molding requires higher temperatures and the copolymer is normally injected into a mold maintained at about 500° F. A one minute mold cycle is used with a barrel temperature of about 650° F. to about 670° F. These conditions, however, depend upon the size of the injection molding equipment.

A series of copolymers was prepared from p,p'-oxybis(aniline) and m-phenylenediamine using different diamine mole ratios and tensile strength and elongation data measured on molded products obtained therefrom. This data is tabulated in Table II along with solution properties and preparative conditions for the copolymers. It may be seen from the table that tensile strength values for the molded copolymers peak at 22,240 p.s.i. at a 40/60 OBA/MPDA ratio, but are excellent up to a mole ratio of OBA/MPDA of about 70/30. A similar effect is noted with the elongation data which maximize at about a mole ratio of OBA/MPDA of 60/40. Beyond the 70/30 OBA/MPDA mole ratio it can be seen from consideration of Table II that the tensile strengths and elongation values fall off rapidly. Hence, a practical upper limit is set on the mole ratio of OBA/MPDA used. In addition to the decline of tensile strengths and elongation values with diamine composition for the molded copolymer the molded article becomes opaque above about a 70/30 mole ratio of OBA/MPDA.

TABLE II

SUMMARY OF COPOLYMER PREPARATION AND MOLDING

| Diamine Mole Ratio OBA/MPDA | Reaction Conditions | | | Viscosity* | Viscosity** | Molded Specimen*** | | Comments |
|---|---|---|---|---|---|---|---|---|
| | Temp., °C. | Add'n,hrs. | Total hrs. | | | Tensile Strength, p.s.i. | Elongation (percent) | |
| 0/100 | 30 | 4 | 6 | 46 | 55 | 19,680 | 7.8 | |
| 10/90 | 40 | 2 | 28 | — | 33 | — | — | |
| 40/60 | 30 | 4 | 5 | 15 | 95 | 22,240 | 12.0 | |
| 60/40 | 30 | 4 | 4.5 | 15 | 175 | 19,850 | 13.7 | |
| 70/30 | 30 | 4 | 4.3 | 36–100 | 148 | 19,430 | 13.0 | |
| 85/15 | 25 | 1.25 | 1.5 | 15–30 | 61 | 9,900 | 4.2 | Non-homogeneous & non-transparent |
| 100/0 | 25 | 1.5 | 1.75 | 15–30 | 69 | 4,650 | 2.0 | Opaque Molding |
| 100/0 | 30 | 4.0 | 4.25 | 46.3 | 148 | — | — | Opaque Molding |
| 60/40 | 30 | 3.5 | 4.25 | Average 32–130 | 60 | 20,489 | 15.0 | |
| | 30 | 3.5 | 5.25 | 130 | 250 | 20,552 | 15.0 | |
| 60/40 | 30 | 3.5 | 6.5 | 30–100 | 94 | — | — | |
| | | | | | | 21,153 | 12.9 | Cured at 1 hr. at 500° F. |
| 60/40 | 30 | 3.7 | 4.8 | 30–250 | 130 | 19,667 | 13.4 | " |
| 50/50 | 30 | 3.5 | 5.0 | 25–205 | 140 | 19,070 | 10.7 | " |
| 70/30 | 30 | 3.5 | 5.0 | 38 | 148 | 20,495 | 13.8 | " |

*In poises as made - 26 percent by weight Solution in DMAC at 25°C. (Brookfield).
**In poises as reformulated - 32 percent by weight Solution in 3:1 NMP/DMAC at 25° C. (Brookfield).
***Molding powder heat treated according to S.N. 755,432. Tensile strengths and elongations were measured according to ASTM D-638.
Abbreviations:
MPDA=meta-phenylene-diamine
OBA =p,p'-oxybis(aniline)
DMAC=dimethylactamide
NMP =N-methylpyrimidone
4-TMAC=trimellitoyl chloride anhydride As an indication of the improved thermal stability of molded articles made from the instant copolymer compositions as opposed to those made from a single diamine, aging experiments have shown that molded articles from a copolymer composition with a 70/30 OBA/MPDA ratio which are heated 2,000 hours at 500° F. show a 91 percent retention of tensile strength. This is to be compared with similar data from measurements on molded articles made from 4-TMAC and MPDA after being heated 2,000 hours at 500° F. The tensile strength of a molded item to which 5 percent of Teflon (the completely fluorinated analogue of polyethylene) was added showed only a 78 percent retention of tensile strength.

Polymer flow properties at molding temperature are remarkably improved by utilizing the copolymer composition. This improvement yields a decided advantage when molding objects of intricate shape and for extrusion or transfer molding fabrication. An estimate of the comparative plastic flow of a 60/40 OBA/MPDA copolymer and the polymer derived from MPDA alone was obtained by use of a modified ASTM method, D-731-57. In this method as modified a cup mold of the flash type is used and the rate of closure of the mold is measured. The heated mold is filled with a measured weight of preheated material which has been previously found to fill the cup. The test involves measuring the time between the start of pressure build-up to the complete closure of the mold. This time is sensitive to the type of mold surface and in Table III it can be seen that using chrome-plated surfaces mold closure times were reduced from 8 minutes to one-half minute when the copolymer was used. Greater polymer flow occurs at still lower OBA ratios, but polymer softening temperature is then below the "high temperature" polymer range.

TABLE III

FLOW PROPERTY COMPARISON*
CHROME-PLATED MOLD

| Polymer Type ** | Mold Closure Time |
|---|---|
| MPDA: 100 mole percent | 8 minutes |
| OBA/MPDA: 60/40 mole ratio | 0.5 minutes |

*Molding temperature: 660° F.; Molding pressure: 5,000 p.s.i. A preheat of the molding powder of 5 minutes at 500° F. was used.
**Polymers made from 4-TMAC.

Heat distortion temperature under load has also been determined for both AI-11 (MPDA) polymer and AI-copolymer. With the improved flow characteristics of the AI-copolymer, a lower heat distortion temperature was expected. This was not the case, however. Both polymer systems are rated at 535° F. under 164 p.s.i. load by ASTM method D-648-56. Thus, the excellent copolymer molding and flow properties have not been obtained at the expense of thermal properties.

The following Examples illustrate preferred embodiments of this invention. It will be understood that these Examples are for illustrative purposes only and do not purport to be wholly definitive with respect to conditions or scope of the invention.

EXAMPLE I

Reaction was carried out in a 5 gallon Pfaudler kettle equipped with nitrogen purge, stirrer, addition funnel and thermocouple. p,p'-oxybis(aniline) (5.70 lbs., 12.9 moles) and meta-phenylenediamine (1.32 lbs., 5.53 moles) were dissolved in 34.8 lbs. of dimethylacetamide. 4-trimellitoyl chloride anhydride, 8.55 lbs. (18.42 moles) in flake form was then added in portions to the diamine solution over three and one-half hours. The reaction exotherm was allowed to raise the temperature to 30° C. and this temperature was maintained for the remainder of the 4-TMAC addition. Cooling water was used as needed. After 4-TMAC addition was complete, stirring was continued at 30° C. until the solution viscosity reached 30 poises when measured at 25° C. The reaction mixture was then drained from the reactor and copolymer precipitation begun immediately to minimize viscosity increase. The polymer was precipitated in distilled water in a Model D, W. J. Fitzpatric Co., comminuting machine (Fitz mill) over a period of 1 to 2 hours. Solution viscosity increased 120 to 150 poises during this period. After precipitation, the copolymer was washed with distilled water to a pH of 4 to 5 in a centrifuge (1 to 2 hours washing time) and the washed material was then spun dry. The polymer was then dried over several days in a vacuum oven at 50° C. Water content, determined by weight loss at 500° F. (20 minutes), was 7 to 10 percent. At this point the dried polymer reformulated in a 3 to 1 NMP/DMAC mixture had a solution viscosity of 120 poises at 25° C. and was 30 to 40 percent in the imide form.

EXAMPLE II

A 78 gram amount of the copolymer in powdered form made in Example I was heated at 550° F. for about 1 hour. It was then cooled and charged cold into a mold preheated in the press to about 600° to about 650° F. A maximum pressure of 4,200 p.s.i. was applied over a 25 minute period and thereafter the mold and contents cooled to 500° F. under a pressure of 2,100 p.s.i. and the molded item immediately ejected. A disk measuring 5½ inches in diameter and ⅛ inch thick had been formed.

I claim:
1. A process for preparing a molded article which consists essentially of the steps: (1) heating a copolymer consisting essentially of A units having a formula selected from the group consisting of:

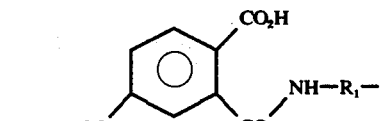

and

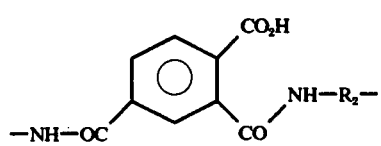

and B units having a formula selected from the group consisting of:

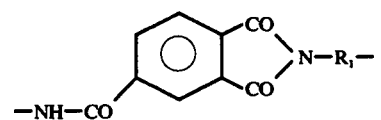

and

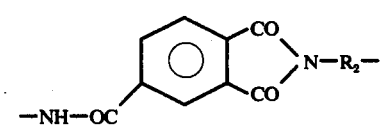

wherein $R_1$ and $R_2$ are different and are chosen from the class consisting of:

 and 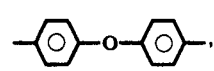

-continued

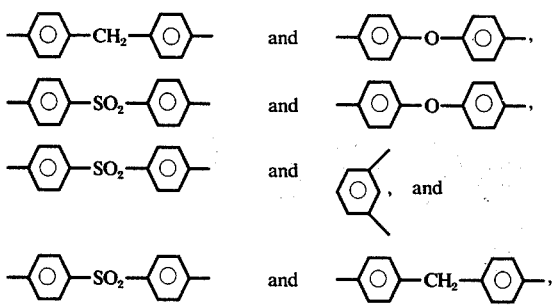

and wherein the proportions of A and B units run from about 1 mole percent A units and about 99 mole percent B units to about 99 mole percent A units and about 1 mole percent B units and wherein the $R_1$ and $R_2$ containing components of the A and B units run from about 10 mole percent $R_1$ containing component and about 90 mole percent $R_2$ containing component to about 90 mole percent of the $R_1$ containing component and about 10 mole percent of the $R_2$ containing component in the temperature range from about 300° to about 700° F. for about 0.5 to about 5 hours, and (2) thereafter applying a pressure of about 200 p.s.i. to about 30,000 p.s.i. to said copolymer while said copolymer is being heated in the temperature range from about 200° to about 750° F.

2. The process of claim 1 wherein a pressure of about 200 p.s.i. to about 25,000 p.s.i. is applied while said copolymer is being heated in the temperature range from about 400° to about 750° F.

3. The process of claim 1 wherein $R_1$ is

and $R_2$ is

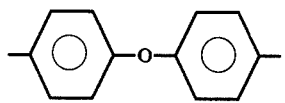

and wherein $R_1$ and $R_2$ containing components of said A and B units are present in the proportions of about 30 mole percent of $R_1$ containing components and about 70 mole percent of $R_2$ containing components to about 70 mole percent $R_1$ containing components and about 30 mole percent $R_2$ containing components.

4. The process of claim 3 wherein said step (1) is carried out in the temperature range from about 500° to about 600° F. for about 1 to about 2 hours.

5. The process of claim 4 wherein a pressure of about 1,000 to about 20,000 p.s.i. is applied while said copolymer is being heated in the temperature range from about 600° to about 750° F.

6. A shaped article prepared by the method of claim 1 comprising coalesced solid particles of polyamide-imide copolymer.

7. A shaped article prepared by the method of claim 2 comprising coalesced solid particles of polyamide-imide copolymer.

8. A shaped article prepared by the method of claim 3 comprising coalesced solid particles of polyamide-imide copolymer.

9. A shaped article prepared by the method of claim 4 comprising coalesced solid particles of polyamide-imide copolymer.

10. A shaped article prepared by the method of claim 5 comprising coalesced solid particles of polyamide-imide copolymer.

11. The process of claim 1 wherein said copolymer contains in addition reoccurring A units having the formula of:

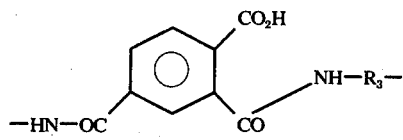

and reoccurring B units having the formula of:

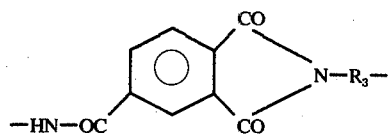

wherein $R_3$ is different from either $R_1$ or $R_2$ but $R_3$ is selected as are $R_1$ and $R_2$ and wherein the $R_1$, $R_2$ and $R_3$ components of the A and B units run from about 10 mole percent of the $R_1$ components and about 40 to about 50 mole percent each of the $R_2$ and $R_3$ components to about 50 mole percent of the $R_1$ components and about 10 to about 40 mole percent each of the $R_2$ and $R_3$ components.

12. The process of claim 11 wherein a pressure of about 200 p.s.i. to about 25,000 p.s.i. is applied while said copolymer is being heated in the temperature range from about 400° to about 750° F.

13. A shaped article prepared by the method of claim 11 comprising coalesced solid particles of polyamide-imide copolymer.

14. A shaped article prepared by the method of claim 12 comprising coalesced solid particles of polyamide-imide copolymer.

15. A process for preparing a molding powder which consists essentially of:
 1. treating a solution of copolymer in an organic solvent with water sufficiently low in cation concentration that the molding properties of said copolymer are not deteriorated, wherein said copolymer consists essentially of A units having a formula selected from the group consisting of:

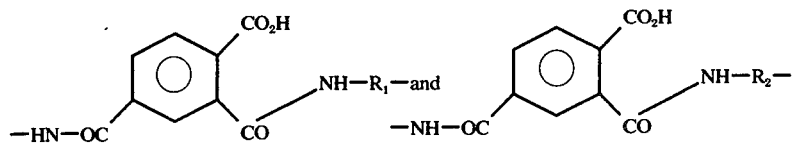

and B units having a formula selected from the group consisting of:

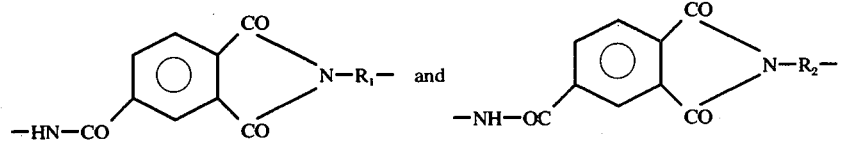

wherein $R_1$ and $R_2$ are different and are chosen from the class consisting of:

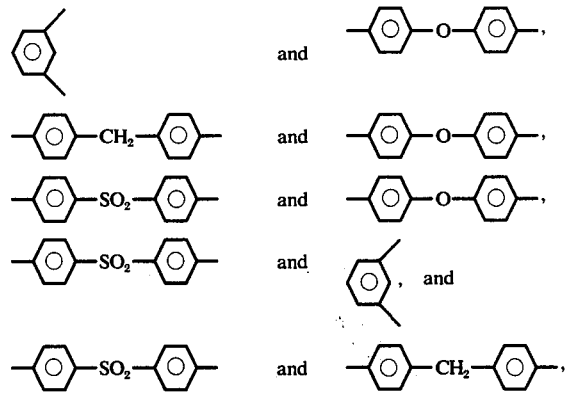

and wherein the proportions of A and B units run from about 1 mole percent A units and about 99 mole percent B units to about 99 mole percent A units and about 1 mole percent B units and wherein the $R_1$ and $R_2$ containing components of the A and B units run from about 10 mole percent $R_1$ containing component and about 90 mole percent $R_2$ containing component to about 90 mole percent of the $R_1$ containing component and about 10 mole percent of the $R_2$ containing component;
2. separating said copolymer from the bulk of said water and said organic solvent;
3. washing said copolymer with an additional amount of said water;
4. separating said copolymer from the bulk of said additional water; and
5. heating said copolymer in the temperature range of from about 300° to about 700° F. for about 0.5 to about 5 hours.

16. The process for preparing a molded article which comprises applying a pressure of about 200 psi to about 30,000 psi to the molding powder copolymer produced by the process of claim 15 while said copolymer is at a temperature in the range of from about 200° to about 750° F.

17. The process of claim 15, wherein hypohalous acid is a byproduct of the reaction used to prepare said copolymer, the water sufficiently low in cation concentration that the molding properties of said copolymer are not deteriorated is distilled water and the washing with said distilled water is continued until wash water has a pH in the range of about 4 to about 5.

18. The process of claim 15, wherein steps (2) and (4) are achieved by centrifuging.

* * * * *